United States Patent
Kacker et al.

(10) Patent No.: US 7,366,322 B2
(45) Date of Patent: *Apr. 29, 2008

(54) AUTOMATED COPYRIGHT DETECTION IN DIGITAL IMAGES

(75) Inventors: Dhiraj Kacker, Burlingame, CA (US); Russell Ennio Muzzolini, San Carlos, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/514,812

(22) Filed: Sep. 1, 2006

(65) Prior Publication Data

US 2007/0002362 A1   Jan. 4, 2007

Related U.S. Application Data

(63) Continuation of application No. 10/335,472, filed on Dec. 31, 2002, now Pat. No. 7,120,274.

(51) Int. Cl.
*G06K 9/00* (2006.01)
*G06K 15/00* (2006.01)
*H04L 9/00* (2006.01)
*G06Q 30/00* (2006.01)

(52) U.S. Cl. ............... 382/100; 358/3.28; 713/160; 713/176; 705/26

(58) Field of Classification Search ............... 382/100; 358/3.28; 705/26; 713/160, 163, 176
See application file for complete search history.

(56) References Cited

U.S. PATENT DOCUMENTS

| 5,636,292 | A |   | 6/1997 | Rhoads |   |
|---|---|---|---|---|---|
| 5,671,282 | A | * | 9/1997 | Wolff et al. | 713/179 |
| 6,182,218 | B1 |   | 1/2001 | Saito |   |
| 6,243,502 | B1 |   | 6/2001 | Christensen et al. |   |
| 6,473,859 | B1 |   | 10/2002 | Enokida |   |
| 7,120,274 | B2 | * | 10/2006 | Kacker et al. | 382/100 |
| 7,120,593 | B1 | * | 10/2006 | Fry et al. | 705/26 |
| 2002/0051577 | A1 |   | 5/2002 | Kinjo |   |
| 2002/0120586 | A1 |   | 8/2002 | Masaki |   |
| 2003/0174859 | A1 | * | 9/2003 | Kim | 382/100 |
| 2005/0169496 | A1 | * | 8/2005 | Perry | 382/100 |

* cited by examiner

*Primary Examiner*—Bhavesh M. Mehta
*Assistant Examiner*—Anthony Mackowey
(74) *Attorney, Agent, or Firm*—Xin Wen

(57) ABSTRACT

A computer-assisted method for detecting copyright protection in digital images receives a digital image, searches for capture device information associated with the digital image, calculates one or more image characteristics of the digital image, and verifies copyright ownership and usage authorization of the digital image in response to the capture device information and the calculated image characteristics.

17 Claims, 4 Drawing Sheets

AUTOMATED COPYRIGHT DETECTION IN DIGITAL IMAGES

The present invention is a continuation patent application of the commonly assigned U.S. patent application Ser. No. 10/335,472, titled "Automated copyright detection in digital images" by Kacker, filed Dec. 31, 2002 now U.S. Pat. No. 7,120,274. The present invention is related to commonly assigned U.S. patent application Ser. No. 09/436,704, filed on Nov. 9, 1999, titled "Distributing Images to Multiple Recipients", by Baum, U.S. patent application Ser. No. 09/450,075 (now U.S. Pat. No. 7,610,059), filed on Oct. 27, 1999, titled "Printing Images in an Optimized Manner", U.S. patent application Ser. No. 09/428,871 (now U.S Pat. No. 6,839,803), filed Oct. 27, 1999, titled "Multi-Tier Data Storage System", U.S. patent application Ser. No. 09/721,484 (now U.S. Pat. No. 7,243,079), filed on Nov. 22, 2000, titled "User Interface and Methods for On-line Print Service", U.S. patent application Ser. No. 09/450,804 (now U.S. Pat. No. 6,583,799), filed on Nov. 29, 1999, titled "Image Uploading", U.S. patent application Ser. No. 09/560,609, filed on Apr. 28, 2000, titled "System and Method of Providing a User Interface for Changing Attributes of an Image-based Product" now abandoned, U.S. patent application Ser. No. 09/684,595 (now U.S. Pat. No. 7,230,628), filed on Oct. 5, 2000, titled "Previewing a framed image print", U.S. patent application Ser. No. 9/972,602 (U.S. Pre-grant Publication 2002/0093678), filed on Oct. 5, 2000, titled "Managing and searching digital images", U.S. patent application Ser. No. 10/106,902 (U.S. Pre-Grant Publication 2003/0182210), filed on Mar. 25, 2002, titled "Producing and sharing personalized photo calendar", U.S. patent application Ser. No. 10/185,862 (now U.S. Pat. No. 7,236,258), filed Jun. 28, 2002, titled "Personalized photo greeting cards", and U.S. patent application Ser. No. 10/302,304; (U.S. Pre-grant Publication 2004/0101156, filed November 2002), titled "Image ranking for imaging products and services". The disclosures of these related applications are incorporated herein by reference.

TECHNICAL FIELD

This application relates to systems and methods for detecting copyrighted digital images for imaging products and services.

BACKGROUND

Advancement of digital imaging technologies have provided consumers unprecedented convenience in capturing, editing, and manipulating hardcopy and digital images. Inexpensive hardware and software tools are now available to allow ordinary consumers to digitize an image on a hardcopy media such as a reflective print or a photographic film, store the output digital image in a computer memory media, manipulate and edit the digital image, and reproduce the digital image using a digital printer. The commercially avaliable digital scanners and digital printers now have such high resolution and high bit depth for each color plane that a consumer can easily reproduce a hardcopy image to achieve an image-quality level similar to the original image print. The ubiquitousness of this capability, however, has posed a threat to the protection and enforcement of the copyrighted images created by professional photographers.

SUMMARY

In one aspect, a system generally includes a computer-assisted method for detecting copyright protection in digital images by
   a) receiving a digital image;
   b) searching information about a capture device associated with the digital image;
   c) calculating one or more image characteristics of the digital image;
   d) verifying the copyright ownership and the usage authorization of the digital image in response to the information about the image capture device and the calculated image characteristics.

In another aspect of the present invention, a system is provided for preventing copyright infringement in producing an image-based product or providing an image service, comprising:
   a) a computer that receives digital images;
   b) a processor that searches information about a capture device associated with the digital image and calculates one or more image characteristics of the digital image; and
   c) a communication system to verify the copyright ownership and the usage authorization of the digital image in response to the information about the image capture device and the calculated image characteristics.

In yet another aspect, the present invention automatically detects or calculates a combination of image characteristics and image properties to determine the probability that a digital image is protected by copyright. The combination of image characteristics and image properties include image source information such as information about the image capture device and image characteristics such as aspect ratio, image characteristics of the digital images can also include image size in pixels, tone curve shape, color distribution and color balance, exposure conditions, pixel values, noise distribution in pixel values, and pixel value histogram distributions. The image characteristics also include information embedded in the digital images. The image characteristics and image properties may include information in the image header information of the image files.

The automated information detection and calculation can be used in combination with visual examination of copyright marks. The use of the computer application for automated detection and screening significantly reduces the labor involved if every digital image has to be visually examined.

The details of one or more embodiments are set forth in the accompanying drawings and in the description below. Other features, objects, and advantages of the invention will become apparent from the description and drawings, and from the claims.

DRAWING DESCRIPTIONS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

The accompanying drawing, which are incorporated in and form a part of this specification, illustrate embodiments of the invention and, together with the description, serve to explain the principles of the invention:

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
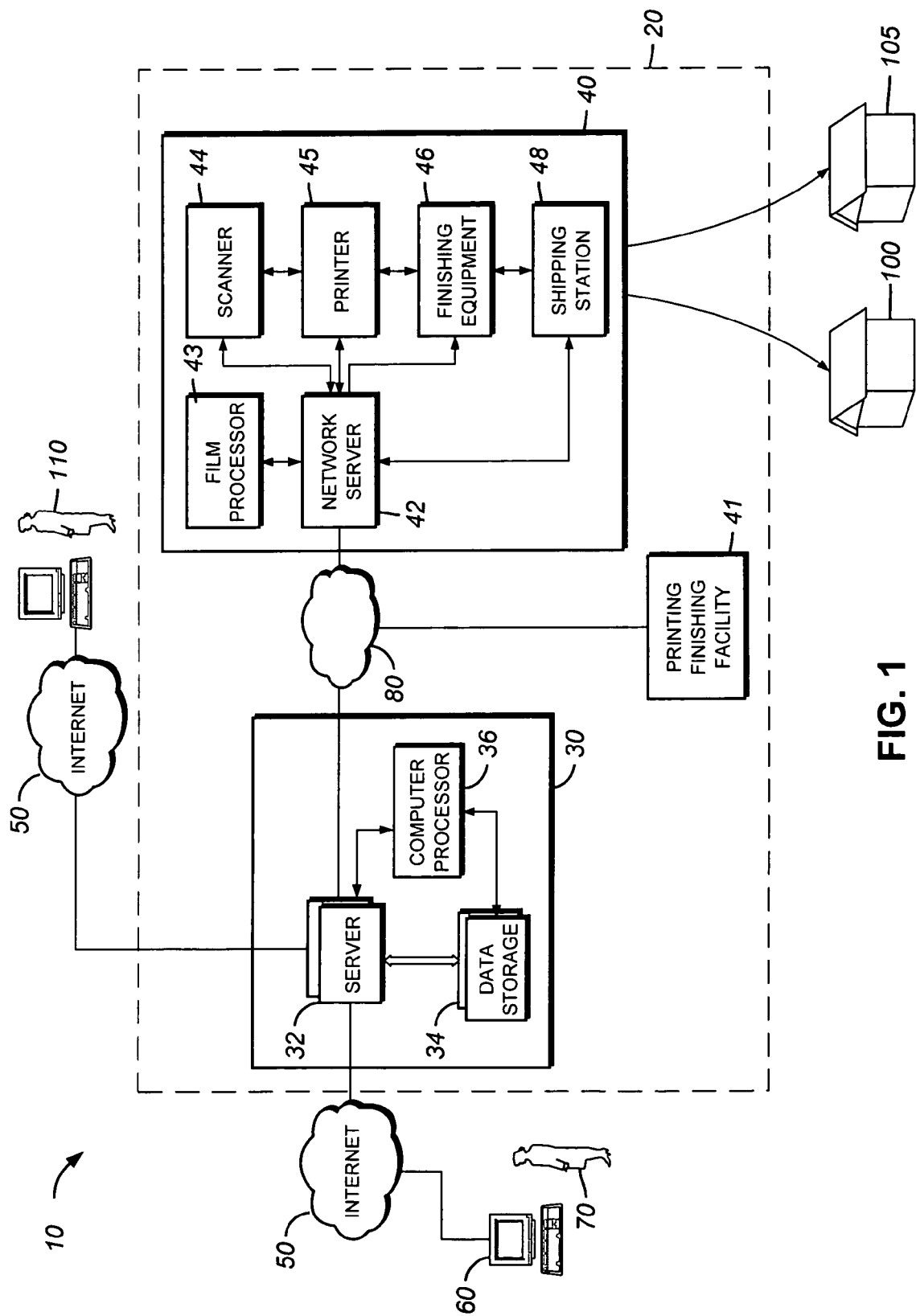
FIG. 1 is a block diagram of a system for producing personalized image-based products for gift products in accordance with the present invention.

FIG. 1 shows a block diagram of the system 10 for producing personalized image-based products in accordance with the present invention. An online photo system 20 is established by a photo service provider to provide photo services on a wide area network such as the Internet 50. The online photo system 20 includes a data center 30 and one or more printing and finishing facilities 40 and 41

In accordance with the present invention, the term "personalized" is used in personalized information, personalized message, personalized image, and personalized design, etc. The term "personalized" refers to the information that is specific to the recipient, the user, the gift product, or the intended occasion. In other words, "personalized" information is "individualized" or "customized", and is not generally applicable to all gift products.

The data center 30 includes one or more servers 32, data storage devices 34 for storing image data, user account and order information, and one or more computer processors 36 for processing orders and rendering digital images. An online-photo website is powered by the servers 32 to serve as a web interface between the users 70 and the photo service provider. The users can order photo products from the web interface. The printing and finishing facilities 40,41 produces the ordered photo products such as photographic prints, greeting cards, photo albums, photo calendars, photo books, photo T-shirt, photo mugs, record images on compact disks (CDs), and framed photo prints. In accordance with the present invention, the greeting cards include folded greeting cards, postcards, trading cards such as baseball cards or game cards, and other form of cards. The users 70 can personalize their greeting cards by including an image uploaded from the website.

The architecture of the data storage devices 34 is designed to optimize the data accessibility, the storage reliability and the cost. Further details on the image data storage in online photo system 20 are provided in the commonly assigned and above referenced U.S. patent application Ser. No. 09/428, 871 filed Oct. 27, 1999, titled "Multi-Tier Data Storage System", which is incorporated herein by reference.

The printing and finishing facilities 40,41 can be co-located at the data center 30. Alternatively, the printing and finishing facility 40,41 can be located remotely from the data center 30. Multiple printing and finishing facilities 40,41 can be set up so that each printing and finishing facility 40,41 can be located geographically close to a large population of customers to shorten order delivery time. Furthermore, the printing and finishing facilities 40,41 and the data center 30 can be owned and operated by different business entities. For example, the data center 30 can be owned by a first business entity that hosts a website that provides a web front and web user interface for the user 70. The printing and finishing facilities 40,41 can be owned by a second business entity that fulfills the photo product orders that are received from the data center 30. In this particular arrangement, the second business entity is often referred as an Application Service Provider (ASP). The photo service provider can provide services to its customers from its own website, as well as fulfill (i.e. ASP) photo products for websites hosted by other business entities.

Figure 4:
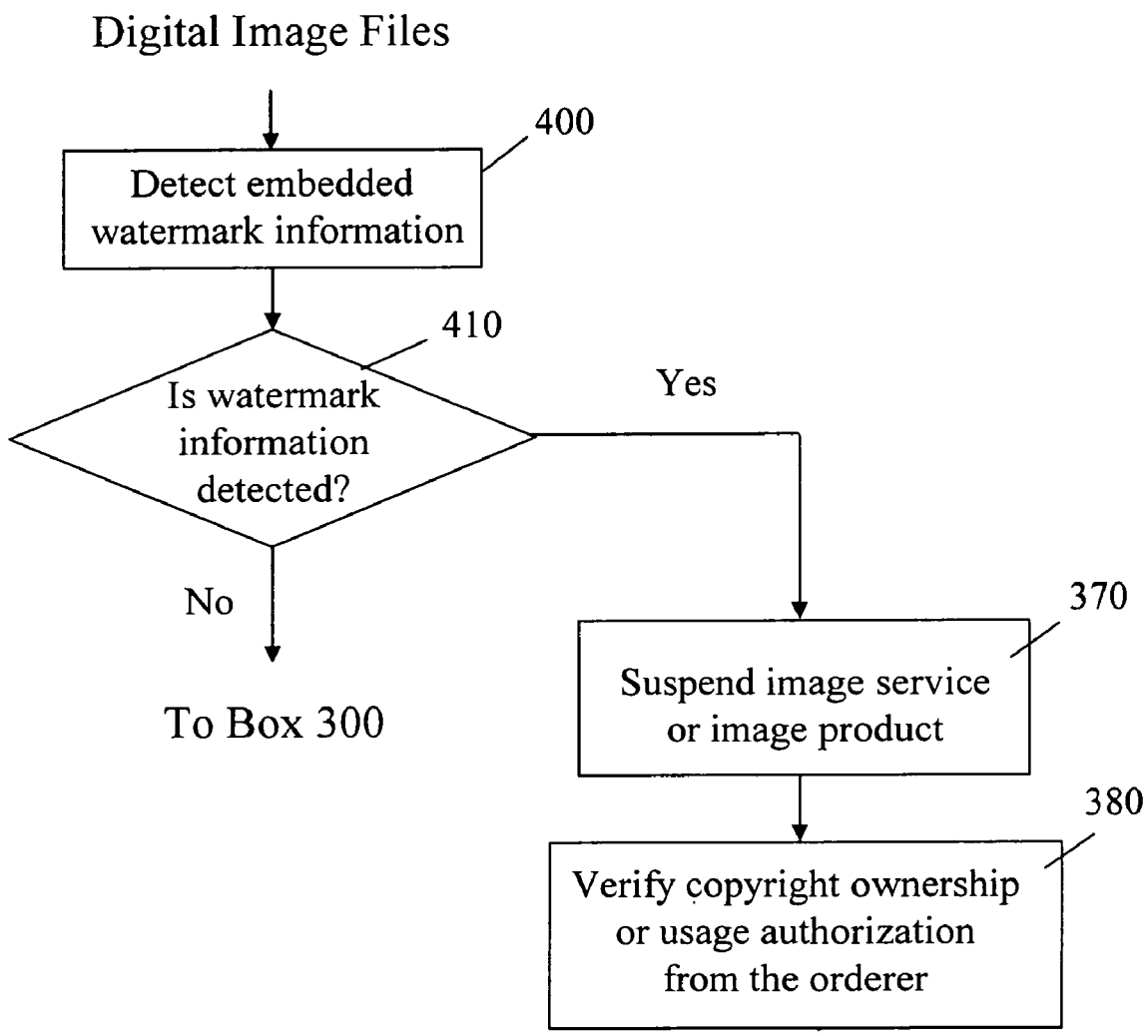
FIG. 4 is a flow diagram for the automated detection of copyrighted digital images in accordance to another embodiment of the present invention.

The printing and finishing facility 40 includes network servers 42 for communicating with the data center 30, printers 45 for printing images on physical surfaces, finishing equipment 46 for operations after the images are printed, and shipping stations 48 for confirming the completion of the orders and shipping the ordered photo products to recipients 100 and 105 (the user 70 can be a recipient). The printers 45 are digital printers that takes digital data input and produces images on a receiver. Examples of printer 45 include digital photographic printers such as Fuji Frontier Minilab printers, Kodak DLS minilab printers, Gretag CYRA FastPrint digital photo printer, or Kodak I-Lab photo printers. The printers 45 can include offset digital printers or digital printing presses such as HP Indigo UltraStream 2000 digital printing press, Xerox's DocuColor printers etc. The printers 45 can also include large format photo or inkjet printers for printing posters and banners. The printing and finishing facilities 40,41 can include a film processor 43 for processing exposed films, and a scanner 44 for digitizing a processed film stripe. The network servers 42 are connected with the data center 30 via a computer network 80 such as a Local Area Network or a Wide Area Network. The order information and image data can be transferred from servers 32 to the network servers 42 using a standard or a proprietary protocol (FTP, HTTP, among others). The finishing equipment 46 can perform any operations for finishing a complete photo product other than photo printing such as cutting, folding, adding a cover to photo book, punching, stapling, gluing, binding, envelope printing and sealing, packaging, labeling, weighing and postage metering. The finishing operations can also include framing a photo print, recording image data on a CD-ROM, etc. Furthermore, the printers and the finishing equipments can be located at different sites. Some finishing operations can be fulfilled by an external contractor. More detailed workflow for producing folded greeting cards is illustrated in FIG. 4.

Figure 2:
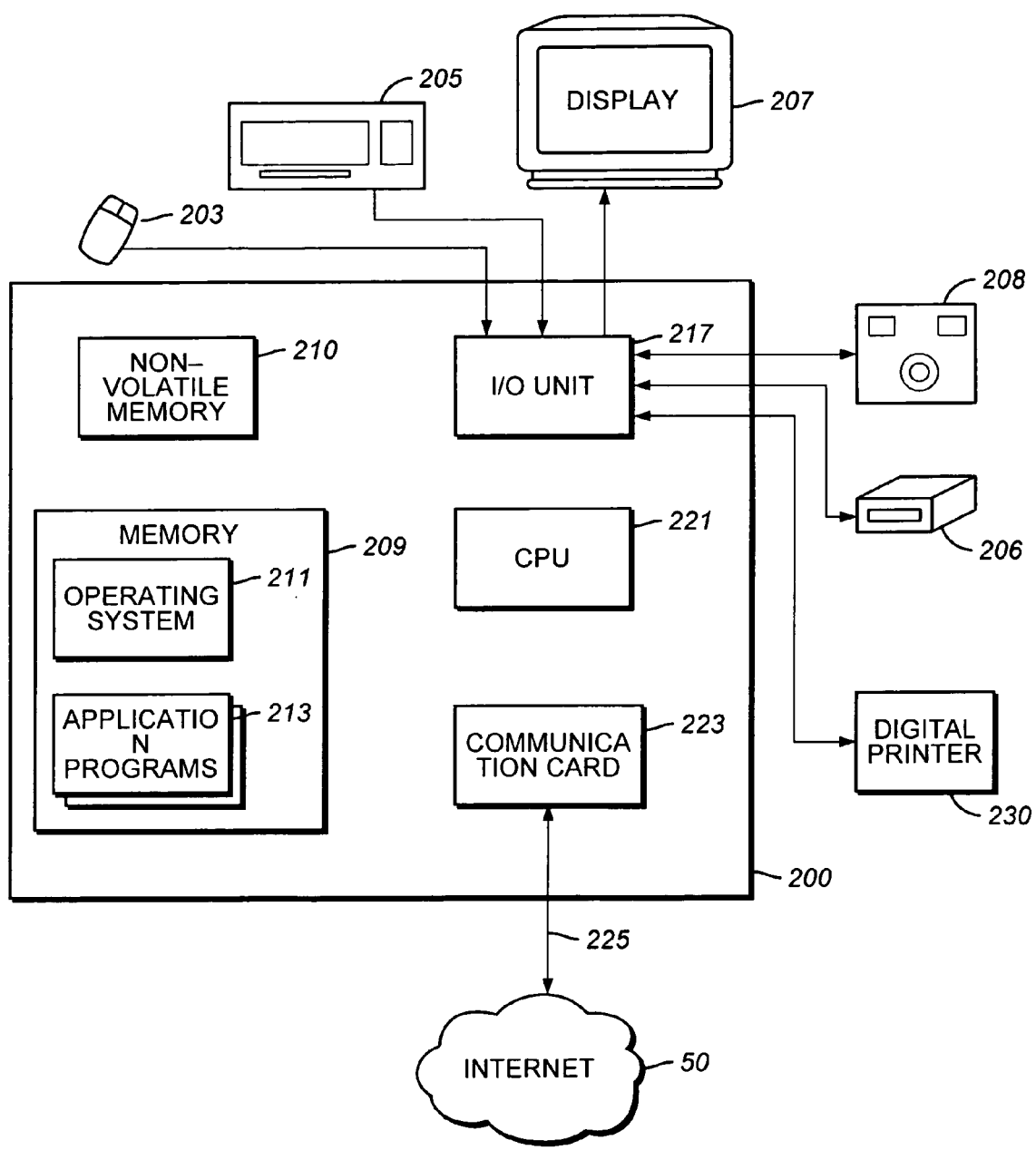
FIG. 2 shows a typical computer that a customer uses for receiving digital image data from a digital image capture device and for accessing a photo hosting website on the Internet.

A user 70 can access the online-photo website using a computer terminal 60 as shown in FIG. 2. The computer terminal 60 can be a personal computer located at a home or at a business, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a floppy disk, CD-ROM, or other removable storage media) and a communications device 223 (e.g., a modem or network adapter) for exchanging data with an Internet 50 via a communications link 225 (e.g., a telephone line).

The computer 200 allows the user 70 to connect to the online-photo website using the communications card or device 223. The user 70 can set up and access her personal account. The user 70 can enter user account information such as the user's name, address, payment information (credit card number), and information about the recipient of the photo products ordered by the user 70. The user 70 can also enter payment information such as credit card number, the name and address on the credit card etc. The user 70 can also send (i.e. upload) digital image data to the online-photo website. In accordance with the present invention, the user can store the images in an online photo album, create personalized image-based product at the web user interface, and order a personal image-based product and a gift product for specified recipients 100 and 105.

The computer 200 of FIG. 2 can also be connected to various peripheral I/O devices such as an image capture device (digital camera, film scanner or reflective scanners). One such peripheral device is a digital camera 208 that enables users to take pictures and save them in digital (electronic) format. Typically, the digital camera 208 is connected to the computer 200 only while the user is transferring images to the computer's disk drive or other non-volatile memory 210. The digital camera 208 can be connected to the computer 200 using a Firewire or an USB port, from a camera cradle (e.g. Kodak DX3900 using an EasyShare Camera Dock), or over wireless media such as radio or optical medium. The digital images captured by a digital camera are typically stored in memory card (e.g., SmartMedia™ or CompactFlash™) that are detachable from the digital camera. The digital images on a memory card can be transferred to the computer 200 using a card reader 206 and saved on non-volatile memory 210.

The user 70 can also obtain digital images from film-based prints from a traditional camera, by sending an exposed film into a photo-finishing service, which develops the film to make prints and/or scans (or otherwise digitizes) the prints or negatives to generate digital image files. The digital image files then can be downloaded by the user or transmitted back to the user by e-mail or on a CD-ROM, diskette, or other removable storage medium. The users can also digitize images from a negative film using a film scanner that is connected to the computer 200 or from a reflective image print using a scanner. Digital images can also be created or edited using an application program 213 (e.g., a graphics program such as Adobe Photoshop).

Once the digital images are stored on the computer 200, a user can perform various operations on them using application programs 213 stored in memory 209. For example, an image viewer application can be used for viewing the images and a photo editor application can be used for touching up and modifying the images. In addition, an electronic messaging (e.g., e-mail) application can be used to transmit the digital images to other users. In accordance with the present invention, one of the application programs 213 can enable the user 210 creating a personalized image-based product on the computer 200. Several of the above described imaging functions can be incorporated in one imaging software, which can be provided by the photo service provider and installed on computer 200 for the user 70.

In addition to viewing the digital images on the computer display 207, the user 70 may desire to have physical photo products made of digital images. Prints can be generated by the user 70 using a digital printer 230 that is connected to the computer 200. Typical digital printers 230 can include such as an inkjet printer or a dye sublimation printer. The user 70 can also purchase photo products from the online photo service provider. In accordance with embodiments of the present invention, examples of personalized image-based products may include personalized photo greeting cards, photo prints based on silver halide photographic paper (versus ink jet receiver used by ink jet printers), photo books and albums, photo T-shirt, and photo, mugs etc. The personalized image-based products can include users' photos and personalized text. The production of these photo products often require the use of commercial equipment which are usually only available at a commercial production location such as the printing and finishing facilities 40 and 41. One online photo service provider that makes such photo products is Shutterfly, Inc., located at Redwood City, Calif., U.S.A.

In accordance with the present invention, the user 70 can be a consumer that accesses the computer terminal 60 from home or a public entry terminal. The user 70 can also be a business owner or employee that may access the computer terminal 60 at a retail location such as a photo shop or a printing store. The computer programs described in the present invention can be one of the application programs 213. In the latter case, the digital images may be generated by a customer of the business and later provided the business for receiving an imaging service. The present invention is compatible with a retail imaging service using a local computer 200 at the point of sales, or an online photo system wherein a user 70 access a server 32 using a remote computer terminal 60. The formats of communication between the computer terminal 60 and the servers 32 as well as the graphic user interface (as described below relating to FIGS. 3 and 4) can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

A typical process of using an online photo service is now described. The user 70 sends digital images to the servers 32 provided by the online photo system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on a physical storage medium such as a memory card or recordable CD by US mail, overnight courier or local delivery service. The photo-finisher can then read the images from the storage medium and return it to the user, potentially in the same package as the user's print order. In addition, the photo service provider can load data or programs for the user's benefit onto the storage medium before returning it to the user. For example, the photo-finisher can load the storage medium with an application program 213 for the user to create a personalized image-based product on his computer 200.

The user 70 can also send a roll of exposed film, and processed film negatives to the photo service provider. The exposed film is processed by the film processor 43 and digitized by the scanner 44 in the printing and finishing facilities 40, 41. The digital image data output from the scanner 44 is stored on the data storage 34.

After the photo service provider has received the user's digital images, the photo service provider can host the images on the online photo website, at which the user can view and access the images using a browser application. The user 70 accesses the online-photo website to designate which of the images should be reproduced on a photo product, parameters relating to printing (e.g., finish, size, number of copies), and one or more recipients 100, 105 to whom the photo products are to be sent.

In addition to hosting the user's images on a web page, the photo service provider usually stores the images in an image archive on in the data storage 34 so that the user 60 and others given authorization by the user (e.g. the share recipient 110) can access them in the future. The photo service provider can also provide sample images for the users to select for use online or producing a physical photo product.

After the user's images have reached the photo service provider and have been made available online, the user can place an order with the photo service provider. One way to place an order is by having the user 70 view the images online, for example, with a browser and selectively designate which images should be printed. The user can also specify one or more recipients 100,105 to whom prints should be distributed and, further, print parameters for each of the individual recipients, for example, not only parameters such as the size, number of copies and print finish, but potentially also custom messages to be printed on the back or front of a print.

The information stored in the data storage 34 is provided to a printing and finishing facilities 40,41 for producing the photo products. The photo products include photographic prints, but also any other item to which graphical information can be imparted, for example, photo greeting cards, photo holiday cards, photo albums, photo books, photo calendars, playing cards, T-shirts, coffee mugs, mouse pads, key-chains, or any other type of gift or novelty item. The photo products are printed by the printer 45 and finished by finishing equipment 46 according to the printing parameters as specified by the user 70. The photo products are then delivered to the specified recipients 100, 105 using standard U.S. Mail, or courier services such as Federal Express or UPS.

Further details on the generation and distribution of photo products using online photo system 20 are provided in the commonly assigned and above referenced U.S. patent application Ser. No. 09/436,704, filed on Nov. 9, 1999, titled "Distributing Images to Multiple Recipients", by Baum and U.S. patent application Ser. No. 09/450,075 (now U.S. Pat. No. 7,016,059), filed on Oct. 27, 1999, titled "Printing Images in an Optimized Manner", by Baum, et al. The disclosures of these patent applications are herein incorporated by reference.

Figure 3:
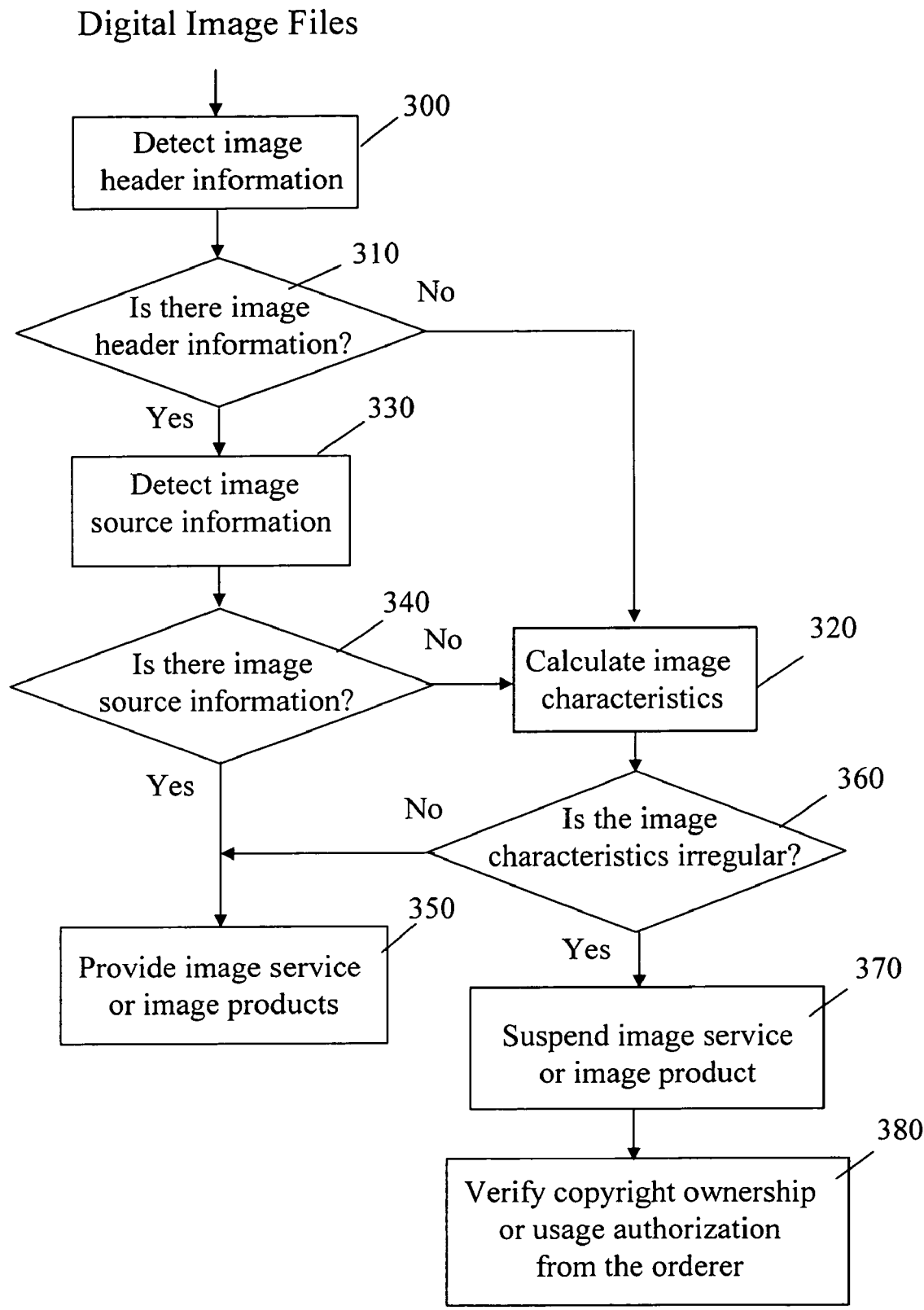
FIG. 3 is a flow diagram for the automated detection of copyrighted digital images in accordance to one embodiment of the present invention.

FIG. 3 is a flow diagram for the automated detection of copyrighted digital images in accordance to one embodiment of the present invention. A user 70 first uploads digital images to server 32 in the online photo system 20. The digital images are stored in data storage devices 34. The user 70 may use the digital images for imaging services such as electronic sharing, electronic greeting cards, photos in web pages, electronic photo calendars, etc. The user may also order from the online photo system 20 image-based products using the digital images including photographic prints, but also any other item to which graphical information can be imparted, for example, photo greeting cards, photo holiday cards, photo albums, photo books, photo calendars, playing cards, T-shirts, coffee mugs, mouse pads, key-chains.

In accordance to the present invention, a computer application stored on computer processor 36 (or stored in memory 209 as one of the application programs 213 in computer 200) detects header information in the digital image files provided by user 70 (box 300) to check whether image header information is available associated with the digital images (box 310). With the exception of some of the low-end digital cameras, most digital cameras on the market output digital images in JPEG format with image header information. The image header information often includes information about the model and properties of the digital camera. The image header information sometimes also includes information about the image capture conditions such as exposure time, flash-on or flash-off, image compression ratio etc.

In accordance to the present invention, a method has been developed to screen digital images having high probability of being copyrighted by separating images digitally scanned from image prints from the original digital images captured by digital cameras. It is observed in the present invention that professional photographers usually keep original copyrighted images in a safe image storage under their control unless a proper license of usage is arranged. In most situations, copyright violations involve an infringer digitally scanning a hardcopy copyrighted image print and subsequently using the illegally scanned digital image.

In accordance to the present invention, it is discovered that digital images digitally scanned from hardcopy image prints usually do not have image header information as the digital image files produced by most common digital cameras. Thus the lack of image header information is used in the present invention as an indication for higher probability of copyright violation.

If no image header information is found (box 310), the computer application automatically calculates certain image characteristics of the digital image (box 320). In a preferred embodiment of the present invention, the image characteristics include aspect ratio of the digital image. The aspect ratio is defined by the ratio of the dimensions of a digital image with the dimensions typically being measured in the number of pixels. In accordance with the present invention, it is discovered that digital images produced by digital cameras usually have standard aspect ratios of 1.33 and 1.50. The standard aspect ratios of the digital images from the digital cameras are due to the fact that most image sensors tend to have standard pixel width and pixel height. For example, a common 3 Mega Pixel camera produces image size of 2048 by 1536 in dimensions, that is, an aspect ratio of 1.33. A common 2 Mega Pixel camera produces image size of 1800 by 1200 in dimensions, which gives an aspect ratio of 1.50.

The aspect ratios of digital images can also be a good indicator to detect digital images that are copied from webpages over the Internet. The images displayed on the webpages are often copyright protected. Since the images have often been edited using an photo editing software such as Adobe Photoshop, their image sizes are usually not the same of the original images from the digital cameras.

If image header information is found in the digital image (box 310), the computer application searches image source information in the image header information. The image source information can include the type of image capture device such as the model of the digital camera used to capture the image. If image source information is found to be a digital camera (box 340), the probability is high that the user 70 who uploaded the digital image does own the right to use the digital image because it is rare for the copyrighted original digital images to freely shared. The computer application will approve the use of the digital image for the online photo system 20 to provide image service or image products as ordered by user 70. If proper image source information is found, for safety reasons, image characteristics of the digital image are calculated (box 320).

In addition to the image aspect ratio, image characteristics of the digital images can also include image size in pixels, tone curve shape, color distribution and color balance, exposure conditions, pixel values, noise distribution in pixel values, and pixel value histogram distributions. For example, it is found that predominant spikes in color distribution in color space in an digital image indicates the higher probability that the digital image may be a copyrighted graphic art image prepared by a professional graphic artist. In another embodiment of the present invention, the noise distributions in pixel values are computed in pixel dimensions or spatial frequency dimensions. In accordance to the present invention, it is found that the noise distributions are different for original digital images from digital cameras and the images scanned from image prints by flatbed scanners. The exposure light sources in common reflective scanners and the texture of the hardcopy image print tend to add noise to the scanned images. The additional noise tends to possess signatures in noise distributions such as prominent peaks at certain spatial frequencies that are absent in the original digital images from digital cameras.

After the image characteristics of the digital image are calculated (box 320), the results of the calculation are compared to one or more predetermined criteria (box 360). For example, the aspect ratios calculated are compared whether they fall into ranges close to the standard aspect ratios of the images from common digital cameras. The ranges may be 1.30-1.36 and 1.45-1.55 respectively for aspect ratios of 1.33 and 1.50. If the calculated image aspect ratios fall within the specified ranges (360), the image characteristics are considered to be regular, that is, the image being highly likely originally produced from a digital camera rather than a digital scanning device. The computer application will approve the use of the digital image for the online photo system 20 to provide image service or image products as ordered by user 70. If the calculated image aspect ratios fall outside of the specified ranges (360), the image characteristics are considered to be irregular. The computer program will report the findings to an interception system and a communication system. The interception system notifies the printing and finishing facility to suspend the production of the image-based product or image service (370). The communication system verifies the copyright ownership and the usage authorization of the digital image from the user 70 (380). The verification can take many forms. The user 70 may be contacted by a customer service personnel at the online photo system 20 via telephone, e-mail and/or fax to inquire about the copyright ownership or usage approval of the digital image. The confirmation of the copyright ownership or the approval of use for the digital image usually requires a signature on paper, an e-mail, or authenticated electronic signature from the user 70. The orders from the user 70 on imaging services and image-based products will continue to be held until such confirmation is received. In orders where only a subset of digital images raise copyright concerns, the orders can be partially fulfilled on the part of the order not based on the questionable images.

In accordance to the present invention, the warning flag raised regarding copyright by the automated computer program in box 360 can also trigger an operator to visually evaluate the digital image in question. The visual examination can be conducted on an electronic display that promptly displays all questionable images. The operator can search for the existence of copyright marks on the digital image and/or any features in the image content that might indicate that the image may be professionally produced. For example, in both digital and analog photography, the exposure conditions and facial illuminations are usually much more elaborate for professional images compared to consumer images. In another example, backdrops commonly used in professional studios are also good indication that the images might be professionally produced. The opposite is also true. The image content and the lack of copyright marking can also lead the conclusion that the image is unlikely to be copyright protected. The image service or image products using the digital image can be provided. It is an advantage of the present invention that the use of the computer application for automated detection and screening significantly reduces the labor involved if every digital image has to be visually examined.

Professionally produced digital image may also have digitally recognizable copyright marks already embedded in the images. The digital copyright marks in these images can be automatically detected in conjunction to the previously described copyright detection and screening process in relation to FIG. 3. FIG. 4 is a flow diagram for the automated detection of copyrighted digital images in accordance to another embodiment of the present invention. The digital images are first provided by a user 70 as previous discussed in relation to FIG. 3.

Next the embedded watermark is detected (box 400). In accordance to the present invention, watermark can be embedded in digital images using techniques such as the one disclosed in U.S. Pat. No. 5,636,292 by Rhoads. The disclosure in U.S. Pat. No. 5,636,292 is herein incorporated by reference in the present patent application. U.S. Pat. No. 5,636,292 discloses that an identification code signal is impressed on a carrier to be identified in a manner that permits the identification signal later to be discerned and the carrier thereby identified. In the application of the present invention, the identification code signal is the watermarking message that a professional photographer has inserted into a digital image. The carrier carrying the identification code signal is embedded in the pixel values of the digital image, but also can be arranged such that it is only detectable by machine and invisible to the eyes.

If embedded watermark is not found using the decoding method as disclosed in U.S. Pat. No. 5,636,292, the image header information is detected as previously discussed (box 300), which is followed by processing steps as shown in FIG. 3.

If no embedded watermark is found in the digital image, there is a high probability that the digital image is copyright protected. The computer program will report the findings to an interception system and a communication system. The interception system notifies the printing and finishing facility to suspend the production of the image-based product or image service (370). The communication system verifies the copyright ownership and the usage authorization of the digital image from the user 70 (380).

Various implementations of the systems and techniques described in this invention are compatible with different computer systems. The system and methods for automated detection of copyrighted digital images are applicable to various imaging devices such as digital camera, video camera, digital printer, scanners, imaging kiosks, computes at home, in an office or a retail location, and a servers at a website hosted by an online photo system 20.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

ELEMENT NUMBER LIST 10 system for producing personalized image-based products
20 online photo system
30 data center
32 server
34 data storage devices
36 computer processor
40 printing and finishing facility
41 printing and finishing facility
42 network server
43 film processor
44 scanner
45 printer
46 finishing equipment
48 shipping station
50 Internet
60 computer terminal
70 user
80 computer network
100 recipient
105 recipient
110 share recipient
200 computer
203 mouse
205 keyboard
206 card reader
207 computer display
208 digital camera
209 memory
210 non-volatile memory
211 operating system
213 application program
217 I/O unit
221 Central Processing Unit (CPU)
223 communication device
225 communications link
230 digital printer
300 Detect header information
310 Is there image header information?
320 Calculate image characteristics
330 Detect image source information
340 Is there image source information?
350 Provide image service or image products
360 Is the image characteristics irregular?
370 Suspend image service or image products
380 Verify copyright ownership or usage approval from the orderer
400 Detect embedded watermark information
410 Is embedded watermark information detected?

What is claimed is:

1. A computer-assisted method for detecting copyright protection in digital images, comprising:
    receiving a digital image;
    calculating one or more image characteristics of the digital image, wherein the image characteristics include a first aspect ratio of the digital image;
    determining whether the first aspect ratio of the digital image is within a pre-specified range of a predetermined value, wherein the predetermined value is a second aspect ratio associated with digital images produced by digital cameras; and
    verifying copyright ownership or usage authorization of the digital image only if the first aspect ratio is outside of the pre-specified range of the predetermined value.

2. The method of claim 1, wherein the predetermined value is 1.33 or 1.5.

3. The method of claim 1, wherein the pre-specified range is within 0.05 of the predetermined value.

4. The method of claim 1, wherein the predetermined value is associated with dimensions of an image sensor in a digital camera.

5. The method of claim 1, wherein the image characteristics include at least one of: image size, tone curve, color distribution and color balance, exposure conditions, pixel values, noise distribution, and pixel value histogram distributions.

6. The method of claim 1, wherein the image characteristics include information embedded in the digital images, wherein the information embedded in the digital images relates to copyright ownership or usage authorization of the digital image.

7. The claim of 1, wherein the pre-specified range is within 0.03 of the predetermined value.

8. The method of claim 1, further comprising:
searching for capture device information associated with the digital image; and
verifying copyright ownership or usage authorization of the digital image in response to the result of searching capture device information.

9. The method of claim 8, wherein the capture device information comprises header information of the digital image.

10. The method of claim 1, further comprising:
ordering an image-based product or an image service using the digital image; and
providing the image-based product or image service using the digital image when the copyright ownership or the usage authorization of the digital image is verified.

11. The method of claim 10, wherein the image-based product or image service includes photographic prints, electronic image sharing, photo greeting cards, photo holiday cards, photo calendars, photo album, and photo books.

12. The method of claim 1, further comprising uploading the digital image over a computer network to a server.

13. The method of claim 1, further comprising visually verifying copyright ownership, usage authorization, or the image content of the digital image.

14. A computer-assisted method for determining the probability of copyright protection in digital images, comprising:
uploading the digital image over a computer network to a server;
calculating one or more image characteristics of the digital image, wherein the image characteristics include a first aspect ratio of the digital image;
determining whether the first aspect ratio of the digital image is within a pre-specified range of a predetermined value, wherein the predetermined value is a second aspect ratio associated with digital images produced by digital cameras;
verifying copyright ownership or usage authorization of the digital image only if the first aspect ratio is outside of the pre-specified range of the predetermined value;
providing an image-based product or an image service using the digital image when copyright ownership is verified or usage authorization is received for the digital image; and
stopping to provide the image-based product or the image service using the digital image when copyright ownership is verified or usage authorization is not received for the digital image.

15. A system for preventing copyright infringement, comprising:
a computer configured to receive a digital image;
a computer processor configured to calculate one or more image characteristics of the digital image, wherein the image characteristics include a first aspect ratio of the digital image, the computer processor is configured to determine whether the first aspect ratio of the digital image is within a pre-specified range of a predetermined value, wherein the predetermined value is a second aspect ratio associated with digital images produced by digital cameras; and
a copyright-verification system configured to verify copyright ownership or usage authorization of the digital image only if the first aspect ratio is outside of the pre-specified range of the predetermined value.

16. The system of claim 15, wherein the pre-specified range is within 0.05 of the predetermined value.

17. The system of claim 15, wherein the predetermined value is 1.33 or 1.5.

* * * * *